Dec. 26, 1967

D. A. EVERT 3,360,174

WEB FOLLOWER ARM

Filed Oct. 11, 1965

INVENTOR.
DONALD A. EVERT

BY Arthur H. Swanson

ATTORNEY.

3,360,174
WEB FOLLOWER ARM

Donald A. Evert, Littleton, Colo., assignor to Honeywell Inc., Minneapolis, Minn., a corporation of Delaware Filed Oct. 11, 1965, Ser. No. 494,674
4 Claims. (Cl. 226—190)

ABSTRACT OF THE DISCLOSURE

A web follower arm having a first arm pivoted at one end and spring biased in a fixed direction. A second arm is pivotally mounted upon the first arm opposite the pivot point of the first arm and is biased with respect thereto by a second spring. A web guide is rotatably mounted upon the second arm to support a moving web against which it is urged by the first and second springs.

The present invention relates to web transport apparatus. More specifically, the present invention relates to web guides.

An object of the present invention is to provide an improved web guide and follower arm.

Another object of the present invention is to provide an improved guide and follower arm for accurately following motions of a moving web.

A further object of the present invention is to provide a web follower arm having two natural frequencies of operation to follow a moving web over a wide span of web motion frequences.

Still another object of the present invention is to provide a dual frequency follower arm having natural frequencies of operation encompassing the range of web motion frequencies.

In accomplishing these and other objects, there has been provided, in accordance with the present invention, a dual frequency web follower arm having a first arm pivoted at one end and spring biased in a fixed direction and a second arm pivotally mounted on the opposite end of the first arm from the pivot and biased by a spring with respect to the first arm. A web guide is rotatably mounted on a free end of the second arm to support a moving web.

A better understanding of the present invention may be had when the following detailed description is read in connection with the accompanying drawings, in which.

Figures 1, 2:
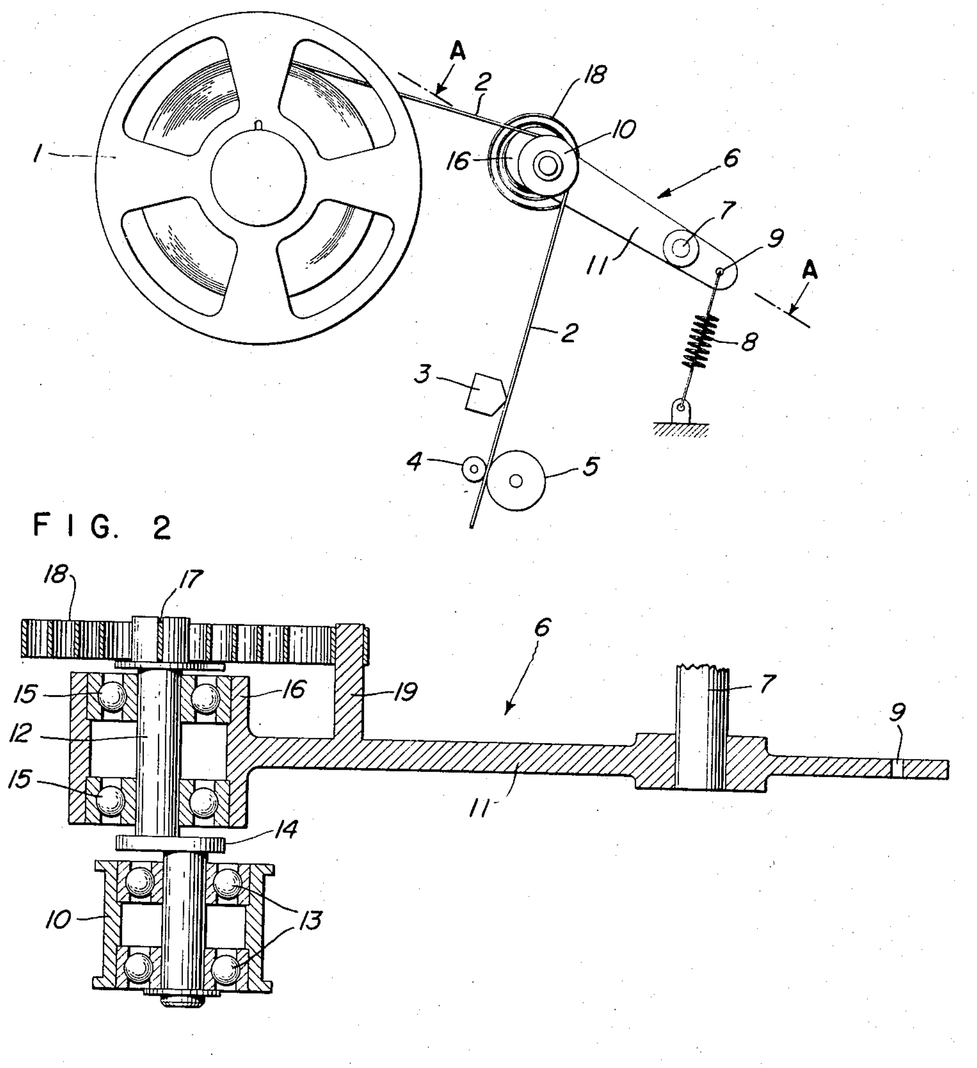
FIG. 1 is a pictorial illustration of a follower arm embodying the present invention.
FIG. 2 is a cross-section of the follower arm shown in FIG. 1 taken along line A.

Referring to FIG. 1 in more detail, there is shown a follower arm embodying the present invention and associated with a partial showing of a tape transport comprising a tape supply reel 1, a recording tape 2, a recording head 3, a capstan 4 and a pinch roller 5 arranged in a manner well-known in the art to move the tape 2 past the recording head 3. The follower arm 6 is arranged to contact the tape 2 to provide a tensioning action to the tape 2. The arm 6 is pivoted at a first pivot pin 7 and is spring biased by a first spring 8, engaging a hold 9 in arm 6, against the tape 2. The tape 2 passes over a tape roller 10 spaced from the pivot 7 by plate 11 and rotatively mounted thereon.

Figure 3:
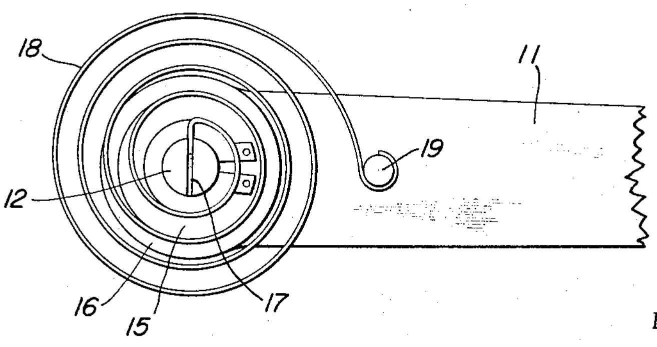
FIG. 3 is a pictorial view of one end of the follower arm shown in FIG. 2.

As shown in FIG. 2, the tape roller, or guide, 10 is mounted on on end of an eccentric shaft 12 on a pair of internal bearings 13. The eccentric shaft 12 has a center ring 14 dividing the offset shaft end pieces. The other end of shaft 12 is, also, journaled in a pair of bearings 15 mounted in a cylindrical socket 16 on the opposite end of the plate 11 from the spring hole 9. The end of the shaft 12 is extended past the outside one of the bearings 15 and is provided with a slot 17. A flat helical spring 18 is mounted on the arm 6 with the inner end engaged in slot 17 and the outer end wrapped about a pin 19 projecting from the plate 11. The details of the mounting of the spring 18 are shown in FIG. 3.

In operation, the tape guide 10 is spring biased by springs 8 and 18 against the tape 2. The function of the follower arm 6 is to follow the motion of the tape 2 induced by capstan 4. During this following motion, the frequency of the follower arm and spring is usually determinative of the effect of the follower arm on tape motion. Conventional follower arms can be the cause of excessive tape vibration causing undue tape fatigue and wear. Particularly, in incremental, or stepping motor, recorders the follower arm is required to follow the stepper motor motion up to the maximum stepping rate as well as to minimize tape loading starting and stopping. This invention is directed to a dual frequency follower arm to overcome the prior art deficiencies. It may be shown that at and above the natural frequency of the conventional follower arm motion does not correspond to the tape motion. The present invention is arranged to provide a first follower arm having a substantial length and a soft spring. This arm has a low natural frequency and is capable of large motions. A second follower arm is mounted on the end of the first arm with a relatively stiff spring and a high natural frequency. The first arm, accordingly, will follow the large excursions, low frequency tape motions occurring during start and stop operations while the small will follow the high frequency, small excursion tape motions induced by the continued operation of the capstan 4.

The first arm comprising plate 11, socket 16 and spring 8 is pivoted at pivot pin 7. This arm can be designed to have a low natural frequency; i.e., below 100 c.p.s. The second arm comprising the guide 10, the ring 14 and spring 18 is pivoted on shaft 12 in socket 16. The second arm can be designed to have a high natural frequency; i.e., 1000 c.p.s. Thus, the dual frequency arm of the present invention will accurately follow the motion of the tape 2 at all times to limit tension changes by providing a loop under fixed tension.

Accordingly, it may be seen that there has been provided, in accordance with the present invention, an improved follower arm for a moving web which is capable of accurately following the high and low frequency motions of the web induced by a transport apparatus.

What is claimed is:

1. A web follower arm comprising a first arm, a pivot at a first end of said arm, a first spring bias means attached to said first arm and arranged to bias said arm around said pivot, a second arm, second pivot means for said second arm mounted on a second end of said first arm, second springs means connected between said second pivot means and said first arm and arranged to bias said second arm, and a web guide roller rotatably mounted on said second arm in a non-interfering position with respect to said second pivot means and said second spring means.

2. A web follower arm as set forth in claim 1 wherein said first arm and said first spring means have a natural resonant frequency is approximately one-tenth the natural resonant frequency of said second arm and said second spring means.

3. A web follower arm as set forth in claim 1 wherein said second arm comprises a first shaft, a metal plate mounted on a first end of said first shaft, a second shaft having one end connected to the other side of said metal plate from said first shaft and having a longitudinal axis parallel to a longitudinal axis of said first shaft and displaced therefrom in an eccentric relationship with said first shaft, and said spring means being a flat helical spring connected between a second end of said first shaft and said first arm.

4. A web follower arm comprising an arm means, means for pivoting said arm means, resilient means arranged to resiliently bias said arm means toward said web, second arm means associated with said first arm means, second means for pivoting said second arm means, and second resilient means arranged to resiliently bias said second arm means against said web.

References Cited

UNITED STATES PATENTS

| | | | |
|---|---|---|---|
| 1,944,039 | 1/1934 | Sweet | 226—198 X |

M. HENSON WOOD, Jr., *Primary Examiner.*

R. A. SCHACHER, *Assistant Examiner.*